(12) United States Patent
Mabuchi

(10) Patent No.: US 9,826,185 B2
(45) Date of Patent: Nov. 21, 2017

(54) HIGH SIGNAL TO NOISE RATIO OF IMAGE BASED ON SIGNALS WITH DIFFERENT SENSITIVITIES

(71) Applicant: SONY CORPORATION, Tokyo (JP)

(72) Inventor: Keiji Mabuchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 206 days.

(21) Appl. No.: 14/921,819

(22) Filed: Oct. 23, 2015

(65) Prior Publication Data

US 2016/0044262 A1 Feb. 11, 2016

Related U.S. Application Data

(63) Continuation of application No. 13/426,719, filed on Mar. 22, 2012, now Pat. No. 9,179,073.

(30) Foreign Application Priority Data

Apr. 6, 2011 (JP) ................................ 2011-084904

(51) Int. Cl.
*H04N 5/378* (2011.01)
*H04N 5/235* (2006.01)
*H04N 5/355* (2011.01)

(52) U.S. Cl.
CPC ........... *H04N 5/378* (2013.01); *H04N 5/2351* (2013.01); *H04N 5/35545* (2013.01)

(58) Field of Classification Search
CPC ... H04N 5/2351; H04N 5/35545; H04N 5/378
See application file for complete search history.

(56) References Cited

U.S. PATENT DOCUMENTS

2009/0115860 A1* 5/2009 Nakashima ........ H04N 5/23248
348/208.99
2012/0217413 A1* 8/2012 Kameshima ......... A61B 6/4233
250/394

* cited by examiner

*Primary Examiner* — Francis M Legasse, Jr.
(74) *Attorney, Agent, or Firm* — Chip Law Group

(57) ABSTRACT

Provided is a solid-state imaging device including: a pixel array section that pixels which detect a physical quantities are arranged in two dimensions of matrix; an AD converting section that performs AD (Analog-Digital) conversion for a plurality of channels of analog pixel signals which are read-out from the pixel array section; and a control section that sets quantized units AD-converted by the AD conversion section according to a gain setting of the unit pixel signal, wherein the control section determines the grayscale number of digital outputs AD-converted for at least one channel of the unit pixel signals according to the gain setting of the pixel signal.

12 Claims, 12 Drawing Sheets

FIG. 9

| GAIN | GRAYSCALE NUMBER (BITS) | | INPUT LENS OF AD CONVERTING CIRCUIT | | QUANTIZED UNIT (1LSB) | | LIGHT AMOUNT RATIO PER 1LSB IN CASE OF 16 FOLD-SENSITIVITY |
|---|---|---|---|---|---|---|---|
| | LOW ILLUMINANCE SIGNAL | HIGH ILLUMINANCE SIGNAL | LOW ILLUMINANCE SIGNAL | HIGH ILLUMINANCE SIGNAL | LOW ILLUMINANCE SIGNAL | HIGH ILLUMINANCE SIGNAL | |
| 1-FOLD | 10 | 12 | 500 mV | 500 mV | 0.5 mV | 0.13 mV | 4 |
| 2-FOLD | 11 | 12 | 500 mV | 250 mV | 0.25 mV | 0.063 mV | 4 |
| 4-FOLD | 12 | 12 | 500 mV | 125 mV | 0.13 mV | 0.031 mV | 4 |
| 8-FOLD | 12 | 12 | 250 mV | 63 mV | 0.063 mV | 0.016 mV | 4 |
| 16-FOLD | 12 | 12 | 125 mV | 31 mV | 0.031 mV | 0.008 mV | 4 |

FIG. 10

| GAIN | GRAYSCALE NUMBER (BITS) | | INPUT LENS OF AD CONVERTING CIRCUIT | | QUANTIZED UNIT (1LSB) | | LIGHT AMOUNT RATIO PER 1LSB IN CASE OF 16 FOLD-SENSITIVITY |
|---|---|---|---|---|---|---|---|
| | LOW ILLUMINANCE SIGNAL | HIGH ILLUMINANCE SIGNAL | LOW ILLUMINANCE SIGNAL | HIGH ILLUMINANCE SIGNAL | LOW ILLUMINANCE SIGNAL | HIGH ILLUMINANCE SIGNAL | |
| 1-FOLD | 10 | 12 | 500 mV | 500 mV | 0.5 mV | 0.13 mV | 4 |
| 2-FOLD | 11 | 12 | 500 mV | 250 mV | 0.25 mV | 0.063 mV | 4 |
| 4-FOLD | 12 | 12 | 500 mV | 125 mV | 0.13 mV | 0.031 mV | 4 |
| 8-FOLD | 13 | 12 | 500 mV | 63 mV | 0.063 mV | 0.016 mV | 4 |
| 16-FOLD | 14 | 12 | 500 mV | 31 mV | 0.031 mV | 0.008 mV | 4 |

FIG. 11

| GAIN | GRAYSCALE NUMBER (BITS) | | INPUT LENS OF AD CONVERTING CIRCUIT | | QUANTIZED UNIT (1LSB) | | LIGHT AMOUNT RATIO PER 1LSB IN CASE OF 16 FOLD-SENSITIVITY |
|---|---|---|---|---|---|---|---|
| | LOW ILLUMINANCE SIGNAL | HIGH ILLUMINANCE SIGNAL | LOW ILLUMINANCE SIGNAL | HIGH ILLUMINANCE SIGNAL | LOW ILLUMINANCE SIGNAL | HIGH ILLUMINANCE SIGNAL | |
| 1-FOLD | 10 | 12 | 500 mV | 500 mV | 0.5 mV | 0.13 mV | 4 |
| 2-FOLD | 11 | 12 | 500 mV | 250 mV | 0.25 mV | 0.063 mV | 4 |
| 4-FOLD | 12 | 12 | 500 mV | 125 mV | 0.13 mV | 0.031 mV | 4 |
| 8-FOLD | 13 | 12 | 500 mV | 63 mV | 0.063 mV | 0.016 mV | 4 |
| 16-FOLD | 14 | NON-USE | 500 mV | NON-USE | 0.031 mV | NON-USE | 4 |

HIGH SIGNAL TO NOISE RATIO OF IMAGE BASED ON SIGNALS WITH DIFFERENT SENSITIVITIES

CROSS REFERENCE TO RELATED APPLICATION

The present disclosure is a continuation application of U.S. patent application Ser. No. 13/426,719 filed in the USPTO on Mar. 22, 2012, which claims priority from Japanese Priority Patent Application JP 2011-084904 filed in the Japan Patent Office on Apr. 6, 2011. Each of the above referenced applications is hereby incorporated by reference in its entirety.

BACKGROUND

The present disclosure relates to a solid-state imaging device and a driving method thereof, and an electronic apparatus using the same, and particularly, related to a solid-state imaging device and a driving method thereof, and an electronic apparatus using the same, which are obtainable a plurality of signals having different sensitivities to expand a dynamic range thereof.

In the related art, as a method of expanding the dynamic range of a signal amount output corresponding to an incident light amount to a solid-state imaging device, there is a method that reads-out a same pixel several times with a plurality of different exposure times and then combines the read-out signals having different sensitivities from each other at the followed stage (for example, refer to Japanese Patent No. 3680366 and Orly Yadid-Pecht and Eric R. Fossum, "Wide Intrascene Dynamic Range CMOS APS Using Dual Sampling", IEEE TRANSACTIONS ON ELECTRON DEVICES, VOL. 44, NO. 10, pp. 1721-1723, OCTOBER 1997.).

SUMMARY

In the method above, the information of a low illuminance portion can be obtained from a long exposure time of signal and the information of the high illuminance portion can be obtained from a short exposure time of signal. However, when a subject is in the low illuminance, it is necessary at least to extend the exposure time of the signal with the long exposure time, but there is a limitation in extending of the exposure time of the signal with the long exposure time. For example, in the dynamic image, the maximum exposure time is only 1/30 sec. Also, in a still image, in order to inhibit a biasing of hand or subject, it has been desirably avoided to extend the exposure time over a predetermined time.

In this case, even in the signal with the long exposure time, since a signal amount is small, it is necessary to raise the gain setting of the solid-state imaging device. To raise the gain setting, there are two methods, that is, one raising an analog gain before an AD (Analog to Digital) conversion, and the other raising the digital gain after the AD conversion.

In the method raising a digital gain, raising the digital gain causes a coarse grayscale of an image. Also, in the method raising the analog gain, in a case where a portion of an image surface is bright, a signal of the bright portion exceeds the input range of the AD conversion circuit carrying out AD conversion, and thus in spite of originally existing of an signal, the signal is lost. Of course, the signal of the bright portion is able to obtain from the signal of the short exposure time, but when compared with the signal of the long exposure time, S/N (Signal/Noise) is low and thus, there has been a concern that the S/N of the obtained image decreases.

The present disclosure has been derived in view of this circumstance and accordingly, even when raising the analog gain in order to obtain a plurality of signals having different sensitivities and then expand a dynamic range thereof, it is desirable that the loss of information of connecting portions of a high sensitivity signal and a low sensitivity signal is prevented, thereby it is able to obtain signals having a high S/N.

According to an embodiment of the present disclosure, there is provided a solid-state imaging device including a pixel array section that pixels which detect physical quantities are arranged in two dimensions of matrix, an AD converting section that performs AD (Analog-Digital) conversion for a plurality of channels of analog pixel signals which are read-out from the unit pixel array section, and a control section that sets quantized units AD-converted by the AD conversion section according to a gain setting of the unit pixel signal, wherein the control section determines grayscale numbers of digital outputs AD-converted for at least one channel of the unit pixel signals according to the gain setting of the pixel signal.

When raising the gain of the unit pixel signal, the control section controls the quantized unit AD-converted by the AD conversion section to be small and the grayscale number of the digital output AD-converted for the unit pixel signal of at least one channel at the same time to be large.

In the solid-state imaging device according to the embodiment of the present disclosure, the AD conversion section performs AD conversion by the AD conversion section for pixel signals of the plurality of channels which sensitivities are different from each other, and when raising the gain of the unit pixel signal, the control section controls the quantized unit AD-converted by the AD conversion section to be small and the grayscale number of the digital output AD-converted for the unit pixel signals, of which sensitivities are high, of at least one channel to be large.

In the solid-state imaging device according to the embodiment of the present disclosure, when raising the gain of the unit pixel signal, the control section controls the grayscale number of the digital output AD-converted for the unit pixel signal, of which the sensitivity is low, of at least one channel not to change.

In the solid-state imaging device according to the embodiment of the present disclosure, before raising the gain of the unit pixel signal, the control section controls the grayscale number of the digital output AD-converted for the unit pixel signal, of which the sensitivity is high, of at least one channel to lower than the value of the grayscale number of the digital output AD-converted for the unit pixel signal, of which the sensitivity is low, of at least one channel.

In the solid-state imaging device according to the embodiment of the present disclosure, the AD conversion section performs AD conversion for pixel signals, which the sensitivity are different from each other, of the plurality of channels by setting differently a detecting time for detecting the physical quantity of the unit pixel.

According to another embodiment of the present disclosure, there is provided a method for driving of a solid-state imaging device which includes a pixel array section that pixels which detect a physical quantity are arranged in two dimensions of matrix, an AD converting section that performs AD (Analog-Digital) conversion for a plurality of channels of analog pixel signals which are read-out from the unit pixel array section, a control section that sets quantized units AD-converted by the AD conversion section according to a gain setting of the unit pixel signal, wherein the method including step of determining a grayscale number of the digital output AD-converted for at least one channel of the unit pixel signals according to the gain setting of the pixel signal.

According to still another embodiment of the present disclosure, there is provided an electronic apparatus which is provided with a solid-state imaging device, wherein the solid-state imaging device including a pixel array section that pixels which detect physical quantities are arranged in two dimensions of matrix, an AD converting section that performs AD (Analog-Digital) conversion for a plurality of channels of analog pixel signals which are read-out from the unit pixel array section, and a control section that sets quantized units AD-converted by the AD conversion section according to a gain setting of the unit pixel signal, wherein the control section determines grayscale numbers of digital outputs AD-converted for at least one channel of the unit pixel signals according to the gain setting of the pixel signal.

According to the embodiments of the present disclosure, AD conversion for a plurality of channels of analog pixel signals read-out from a pixel array section is performed and quantized units AD-converted by the AD conversion section according to gain setting of pixel signals are set, and the grayscale number of the AD-converted digital output for pixel signals of at least one channel according to gain setting of pixel signals is determined.

According to the embodiments of the present disclosure, it is possible to prevent the loss of information as well as to obtain a high S/N of image in a case of obtaining a plurality of signals having different sensitivities and expanding a dynamic range thereof, when raising an analog gain.

BRIEF DESCRIPTION OF THE DRAWINGS

FIG. 9 is a diagram illustrating a relationship of the analog gain with a grayscale number of an AD conversion circuit.

FIG. 10 is a diagram illustrating a relationship analog gain with a grayscale number of an AD conversion circuit.

FIG. 11 is a diagram illustrating a relationship analog gain with a grayscale number of an AD conversion circuit.

DETAILED DESCRIPTION OF EMBODIMENTS

Hereinafter, embodiments according to the present disclosure are disclosed with reference to the attached drawings.

Configuration of Solid-State Imaging Device

Figure 1:
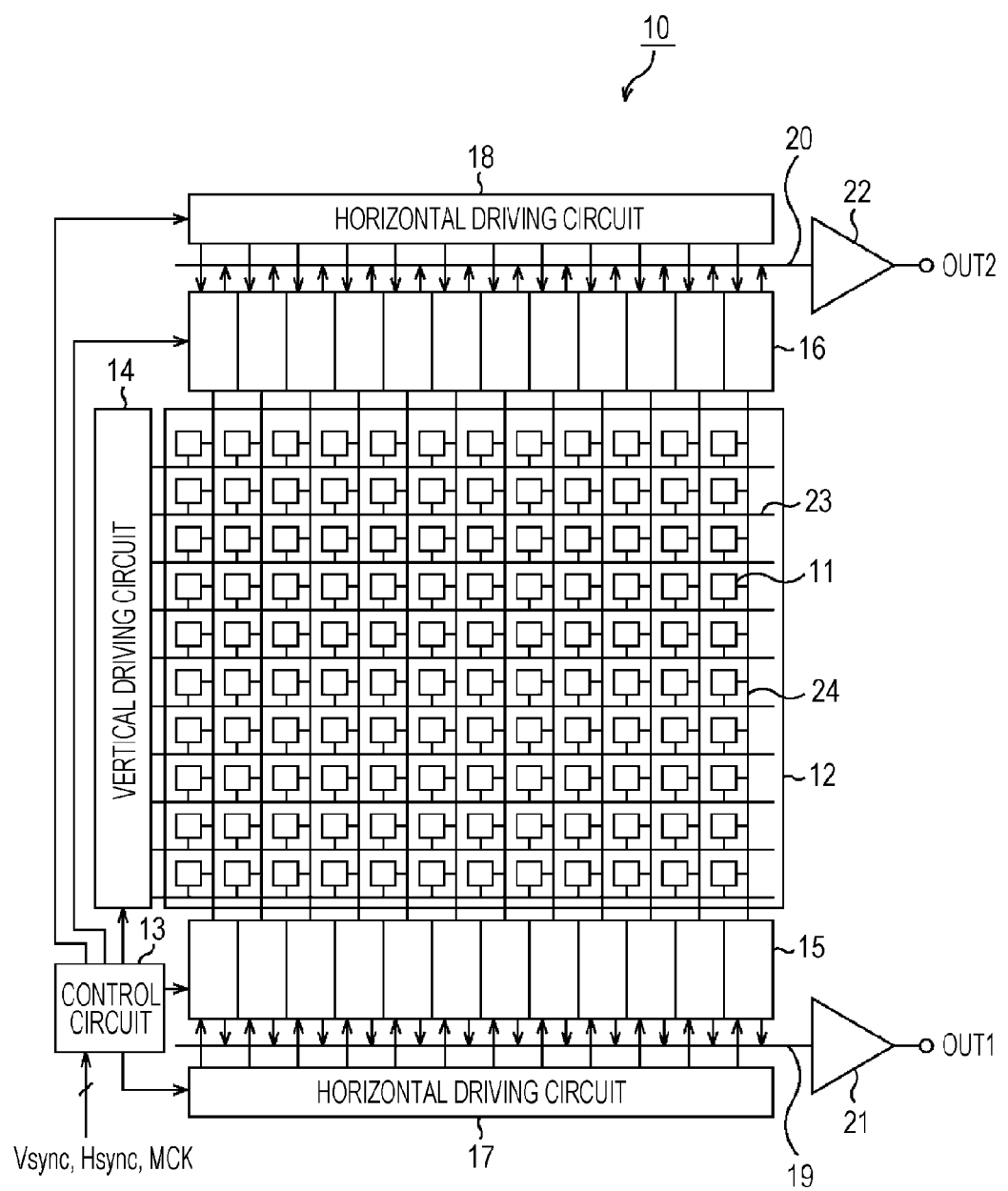
FIG. 1 is a diagram illustrating an example of configuration according to an embodiment of a solid-state imaging device that the present disclosure is adopted.

FIG. 1 is illustrating a configuration of a solid-state imaging device according to an embodiment of the present disclosure. In this embodiment, it discloses that an example of the solid-state imaging device is a CMOS (Complementary Metal Oxide Semiconductor) image sensor, which detects a physical quantity of electrical charge amount corresponding to light amount of visible light as a unit of pixel.

As illustrated on FIG. 1, the CMOS image sensor 10 may be provided with a pixel array section 12 in which a unit pixel 11 (hereinafter, shortly referred to pixel 11) including photoelectric conversion device(s) converting the light amount of an incident visible light into a photoelectric signal is arranged in rows and columns (matrix shape).

The CMOS image sensor 10 may be adapted to a pixel array section 12 and is provided with a control circuit 13 controlling the CMOS image sensor 10 entirely, a vertical driving circuit 14 driving each pixel 11 of the unit pixel array section 12, n-channel(s) of column signal processing circuits 15, 16 processing a signal output from each pixel 11, horizontal driving circuits 17, 18, horizontal signal lines 19, 20 and output circuits 21, 22.

Specifically, the CMOS image sensor 10 is a system of such a configuration that two channels of signal processing mechanism including a column signal processing circuit 15, a horizontal driving circuit 17, a horizontal signal line 19, and an output circuit 21 and a column signal processing circuit 16, a horizontal driving circuit 18, a horizontal signal line 20, and an output circuit 22 are arranged in both sides above and below of the unit pixel array section 12.

In this configuration of the system, the control circuit 13 receives data for commanding an operation mode of the CMOS image sensor 10 or the like from the outside and outputs data including information of the CMOS image sensor 10 to the outside.

Further, on the basis of a vertical synchronized signal Vsync, horizontal synchronized signal Hsync and master clock MCK, the control circuit 13 generates such as clock signals or control signals which plays as reference signals by which drive the vertical driving circuit 14, the column signal processing circuit 15, 16, the horizontal driving circuit 17, 18 and the like. The clock signal or control signal, or the like which is generated from the control circuit 13 is given to the vertical driving circuit 14, the column signal processing circuit 15, 16, the horizontal driving circuit 17, 18 and the like.

In the pixel array section 12, unit pixels 11 are arranged in two dimensions of matrix. As illustrated on FIG. 1, the unit pixels 11 are arranged in tandem in a substantially square lattice. This means that an optical opening which is prescribed by photoelectric conversion devices or metal wires or the like is arranged in tandem in a substantially square lattice, and the circuit portion of the unit pixel 11 is not limited to this configuration. Namely, in the circuit portion of the unit pixel 11 as described below, there is no desired to be surely arranged in parallel in a substantially square lattice.

Additionally, in the pixel array section 12, a pixel driving wire 23 per a pixel row is formed along with left and right directions (array directions of pixels in a pixel row) of the Figure and a vertical signal line 24 per a pixel column is formed along with upper and lower directions (array directions of pixels in a pixel column) of the Figure for the unit pixel 11 arrangement of rows and columns. An end of this pixel driving wire 23 is connected to an output end corresponding to each pixel row of the vertical driving circuit 14.

The vertical driving circuit 14 may be constituted by shift registers or address decoders, and selects and scans each pixel of the pixel array section 12 in a row unit subsequently, and then supplies a desired driving pulse (control pulse) via the unit pixel driving wire 23 to each pixel of the selected row.

Though a specific constitution of the vertical driving circuit 14 is omitted, it may be constituted to provide with a scan channel carrying out the read-out to scan selectively and subsequently pixels 11 in a row unit, and a scan channel carrying out a sweeping scan by preceding more as a shutter speed time portion than the reading-out scanning to sweep out (reset) undesirable electrical charges from the photoelectric conversion device read-out the unit pixel 11.

By sweeping out (reset) the undesirable electrical charges through the sweeping scan channel, so called the electronic shutter operation is carried out. Hereinafter, it is called that the sweeping scan channel is an electronic shutter scan channel. Herein, so called the electronic shutter operation refers to operation which wastes light electrical charges of the photoelectric conversion device, and then commences a new exposure (light electrical charge storage is commenced).

The read-out signal by the read-out operation through the read-out scan channel corresponds to a light amount received just before the previous read-out operation or after the electron shutter operation. Also, a period from a read-out timing by just the previous read-out operation and a sweep-out timing by the electronic shutter operation to the read-out timing by a current read-out operation plays as a storage time (exposure time) of light electrical charges in a unit pixel 11.

Output signals from each pixel 11 of the selected row are supplied to the column signal processing circuit 15 or the column signal processing circuit 16 via the vertical signal line 24 respectively. The column signal processing circuits 15, 16 are respectively arranged above and below the unit pixel array section 12 with a corresponding relationship of 1:1 per a pixel column, for example, of the pixel array section 12, that is, for the unit pixel column.

This column signal processing circuits 15, 16 receive output signals from the selected rows per every pixel 11 row of the pixel array section 12 and carry out a CDS (Correlated Double Sampling) process for eliminating a fixed pattern noise inherent in the signals, a signal amplifying process or the AD conversion process, or the like.

Also, herein, though a case that a configuration in which the column signal processing circuits 15, 16 may be arranged in the corresponding relationship of 1:1 is adapted is illustrated as an example, it is not limited to the configuration, but it is also able to adapt to such a configuration, etc. that arranges one by one the column signal processing circuits 15, 16 per a plurality of pixel columns (vertical signal lines 24), to time-divide the column signal processing circuits 15,16 between multiple pixel columns to use commonly them.

The horizontal driving circuits 17 may be constituted with shift registers or address decoders, etc. to select subsequently the column signal processing circuits 15 by outputting the horizontal scan pulses sequentially. The horizontal driving circuits 18 may be also, similarly to the horizontal driving circuits 17, constituted with shift registers or address decoders, etc. to select subsequently the column signal processing circuits 16 by outputting the horizontal scan pulses in turn.

Further, though drawing is omitted, each of output stage of the column signal processing circuits 15, 16 has a horizontal selection switch which is connected with each of the horizontal signal lines 19, 20. The horizontal scan pulses φH1~φHx output subsequently from the horizontal driving circuits 17, 18 turn on in turn the horizontal selection switches connected to each output stage of the column signal processing circuits 15, 16. These horizontal selection switches turn on in turn in response to the horizontal scan pulses and output in turn pixel signals processed by the column signal processing circuits 15, 16 per each pixel column to the horizontal lines 19, 20.

Output circuits 21, 22 carry out several signal processes for the unit pixel signal supplied in turn via the horizontal signal lines 19, 20 from each of the column signal processing circuits 15, 16 and then output the processed signals. As an example of specific signal processes of these output circuits 21, 22, there is a process buffering only, a process adjusting of a black level before the buffering, a process correcting differences between each column, a process amplifying signal, a process of color relation, or the like.

Circuit Configuration for Pixel

Figure 2:
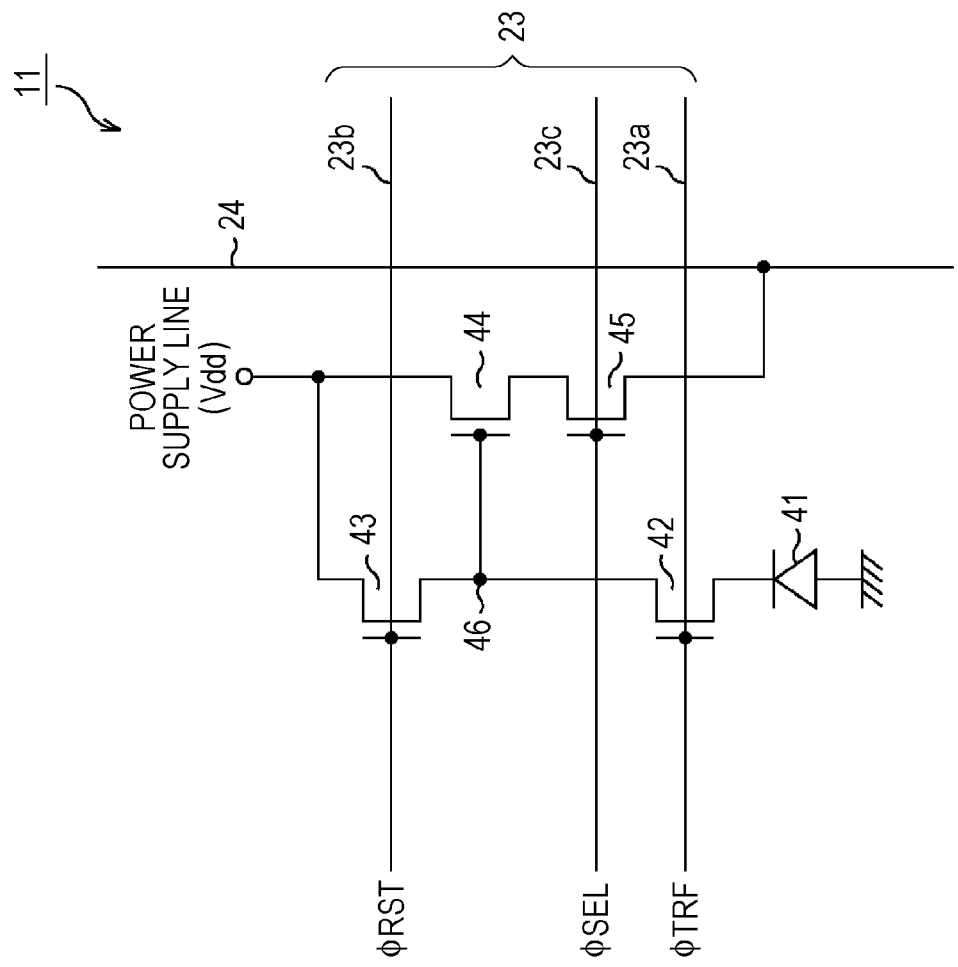
FIG. 2 is a diagram illustrating an example of a configuration of circuit for a unit pixel.

FIG. 2 is a diagram illustrating an example of circuit configuration of the unit pixel 11. The unit pixel 11 illustrated on FIG. 2 has a photo diode 41 for the photoelectric conversion device, a transmission transistor 42, a reset transistor 43, amplification transistor 44 and selection transistor 45.

Herein, as an example of the four transistors of transmission transistor 42 to selection transistor 45, n typed-channel MOS transistor may be used. Merely, the above combination of a conductive type of the transmission transistor 42, reset transistor 43, amplification transistor 44 and selection transistor 45 is only an example, and is not limited to such combination.

Further, as illuminated in FIG. 2, the pixel driving wires 23 for the unit pixels 11 are arranged commonly for each pixel of the same pixel rows as pixel driving wires 23, for example, three driving wires of a transmission wire 23a, a reset wire 23b and a selection wire 23c. Each one end of the transmission wire 23a, reset wire 23b and selection wire 23c is connected in a unit of a pixel row to the output end corresponding to each pixel row of the vertical driving circuit 14.

A photo diode 41 has an anode which is connected to a negative side, for example, a ground and converts a sensed light into light electrical charges (herein, photoelectron) of electrical charge amount corresponding to the light amount (physical quantity). A cathode of the photo diode 41 is connected electrically to a gate of the amplification transistor 44 with an intervention of the transmission transistor 42. A node 46 connected electrically with the gate of this amplification transistor 44 is called to FD (floating diffusion) section.

The transmission transistor 42 is connected between the cathode of the photo diode 41 and the FD section 46, and is turned on by applying a transmission pulse φTRF which a high level (e.g., Vdd level) is disclosed to an active (hereinafter, "high active") to its gate via transmission wire 23a to transmit the light electrical charge converted in the photo diode 41 to the FD section 46.

The reset transistor 43 has a drain connected to a pixel power supply Vdd and a source connected to FD section 46, and is turned on by applying a reset pulse φRST of a high active to its gate with intervention of the reset wire 23b to reset FD section 46 by wasting the electrical charges of the FD section 46 to the pixel power supply Vdd of the unit pixel before a transmission of signal from the photo diode 41 to the FD section 46.

The amplification transistor 44 has a gate connected to the FD section 46 and a drain connected to the pixel power supply Vdd, and outputs the electrical potential of the FD section 46 after resetting by the reset transistor 43 as a reset level, and further, outputs the electrical potential of the FD section 46 after completion of the electrical charge transmission of signal by the transmission transistor 42 as a signal level.

The selection transistor 45 has the drain connected to the source of the amplification transistor 44 and the source connected to the vertical signal line 24 and is turned on by applying the selection pulse φSEL of the high active to its gate with intervention of the selection wire 23c to transmit the output signal from the amplification transistor 44 to the vertical signal line 24 as a selected state of the unit pixel 11.

Further, the selection transistor 45 may be able to adapt a configuration of a circuit connected between the unit pixel power supply Vdd and the drain of the amplification transistor 44.

Further, the unit pixel 11 is not limited to the configuration of the four transistors, and may be able to be circuit constitutions formed from three transistors compatible with the selection transistor 45 as the amplification transistor 44 and, or other circuit constitutions.

Example Obtaining Signal Having Different Sensitivities from Multiple Channels

The CMOS image sensor 10 related to an embodiment according to the above configuration may obtain via multi-channels, for example, two channels in the present embodiment, the signals having different sensitivities from each pixel 11 of the unit pixel array section 12 in order to get a wide dynamic range.

The vertical driving circuit 14 carries out a shutter scan in an electronic shutter scan channel and a reading-out scan by the two channels, for each pixel 11 of the unit pixel array section 12 and is able to obtain signals having different sensitivities (to make differently signal sensitivities in two channels) by differing a detection time i.e., the exposure time for detecting a light amount as a physical quantity by the pixel 11. The length of the exposure time (detection time) is adjusted by an interval of the reading-out scan of the two channels. The specific description thereof is given below.

Figure 3:
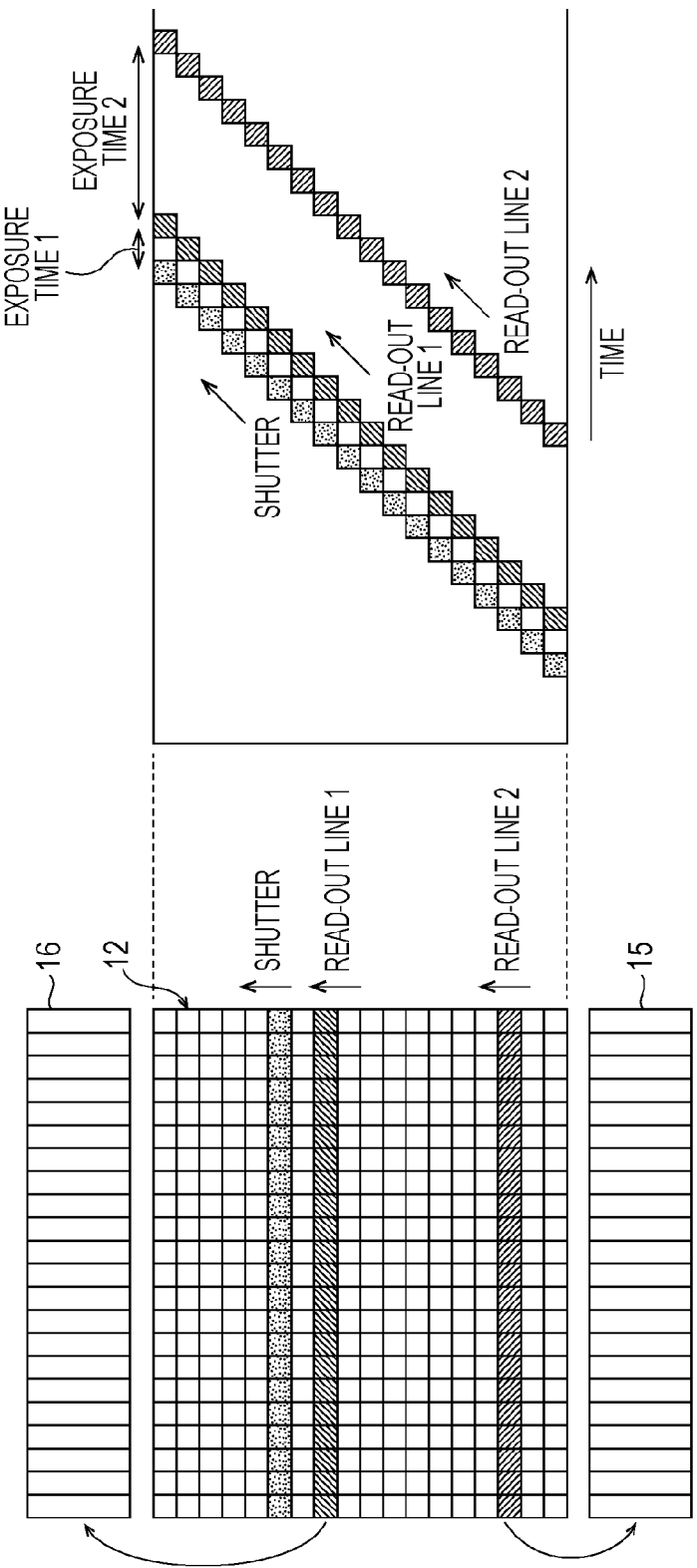
FIG. 3 is a diagram illustrating a shutter scan and a read-out scan of two channels to obtain signals having different sensitivities.

In the reading-out scan, as illustrated on the left side of FIG. 3, two pixel rows are respectively scanned as read-out rows 1, 2 of two channels, and each pixel signal from these 2 read-out rows 1, 2 are read-out to the vertical signal line 24. Further, the column signal processing circuits 15, 16 of the two channels are installed corresponding to the reading-out scan of two channels.

By the vertical scan, as illustrated on the right side of FIG. 3, since a time from a shutter row to a read-out row 1 that the read-out scan of first turn is performed is an exposure time 1 and a time from the read-out row 1 to the read-out row 2 that the read-out scan of second turn is performed is an exposure time 2, by setting differently these consecutive two exposure times (storage time) 1, 2, two signals having different sensitivities from the same pixel, that is, the low sensitivity signal based on a short exposure time 1 and other being a the high sensitivity signal based on a long exposure time 2 are obtainable successively. The setting of the exposure times 1, 2 is processed by the control circuit 13.

By combining the two signals having different sensitivities, namely, a low sensitivity signal and a high sensitivity signal in a combing circuit (not shown) in the later stage, the image signal having the wide dynamic range is able to be obtained. The information of the high illuminance portion of the image signal obtained in this manner is able to be obtained from the low sensitivity signal based on the short exposure time 1, and the information of the low illuminance portion of the obtained image signal is able to be obtained from the high sensitivity signal based on the long exposure time 2. With regard to this, the signal of the high sensitivity signal is referred to a low sensitivity signal and the signal of the high sensitivity is referred to a low sensitivity signal.

Further, with regard to the shutter scan and the reading-out scan as described above, it can be implemented by the following configuration.

In other words, as aforementioned, in the vertical driving circuit 14 having the reading-out scan channel and the electronic shutter scan channel (sweeping scan channel), the electronic shutter scan channel may be constituted with the shift register for example, and outputs an electronic shutter pulse from the shift register in a pixel row unit from the first row subsequently, whereby it is possible to carry out a rolling shutter operation (or focal plane shutter operation) carrying out the shutter scan from the first row subsequently.

Meanwhile, the reading-out scan channel may be constituted with two shift registers, by outputting the scan pulses 1, 2 which select reading out rows 1, 2 from these two shift registers subsequently, it is possible to perform the reading-out scan of two channels. Further, the reading-out scan channel may be also constituted with a address decoder, by assigning address for each row 1, 2 by the corresponding address decoder, it is possible to perform the reading-out scan of two channels.

In this manner, by carrying out the shutter scan by the electronic shutter scan channel and the reading-out scan of two channels by the reading-out scan channel, signals of two channels having different sensitivities are obtainable.

Specifically, as illustrated on the left side of FIG. 3, the shutter row is first scanned and then two read-out rows 1, 2 are scanned. For example, a signal output from the each pixel of the read-out row 1 can be read-out in column signal processing circuit 15 and an output signal from each pixel of the read-out row 2 can be read-out in the column signal processing circuit 16. The combination of the read-out rows 1, 2 and the column signal processing circuits 15, 16 can be changed.

Which one of the column signal processing circuits 15, 16 reads out the signal of which one row of the read-out rows 1, 2 is determined by operation timings of each of the column signal processing circuits 15, 16. Namely, if the column signal processing circuit 15 (16) operates by the scan timing of the read-out row 1, each pixel signal of the read-out row 1 is read-out by the column signal processing circuit 15 (16), and if the column signal processing circuit 16 (15) operates by the scan timing of the read-out row 2, each pixel signal of the read-out row 2 is read-out by the column signal processing circuit 16 (15).

In FIG. 3 right side, the transverse axis represents a time and a scanning profile. Here, the read-out row 1 is defined as the short exposure time 1 and the read-out row 2 is defined as the long exposure time 2, in order to promote understanding, as an example, the exposure time 1 is defined as 2 row portion of time 2H (H is horizontal period) and the exposure time 2 is defined as 8 row portion of time 8H. Thus, the unit pixel sensitivity of the read-out row 1 is low and the unit pixel sensitivity of the read-out row 2 is higher as 4 times than the read-out row 1.

Configuration of Column Signal Processing Circuit

Figure 4:
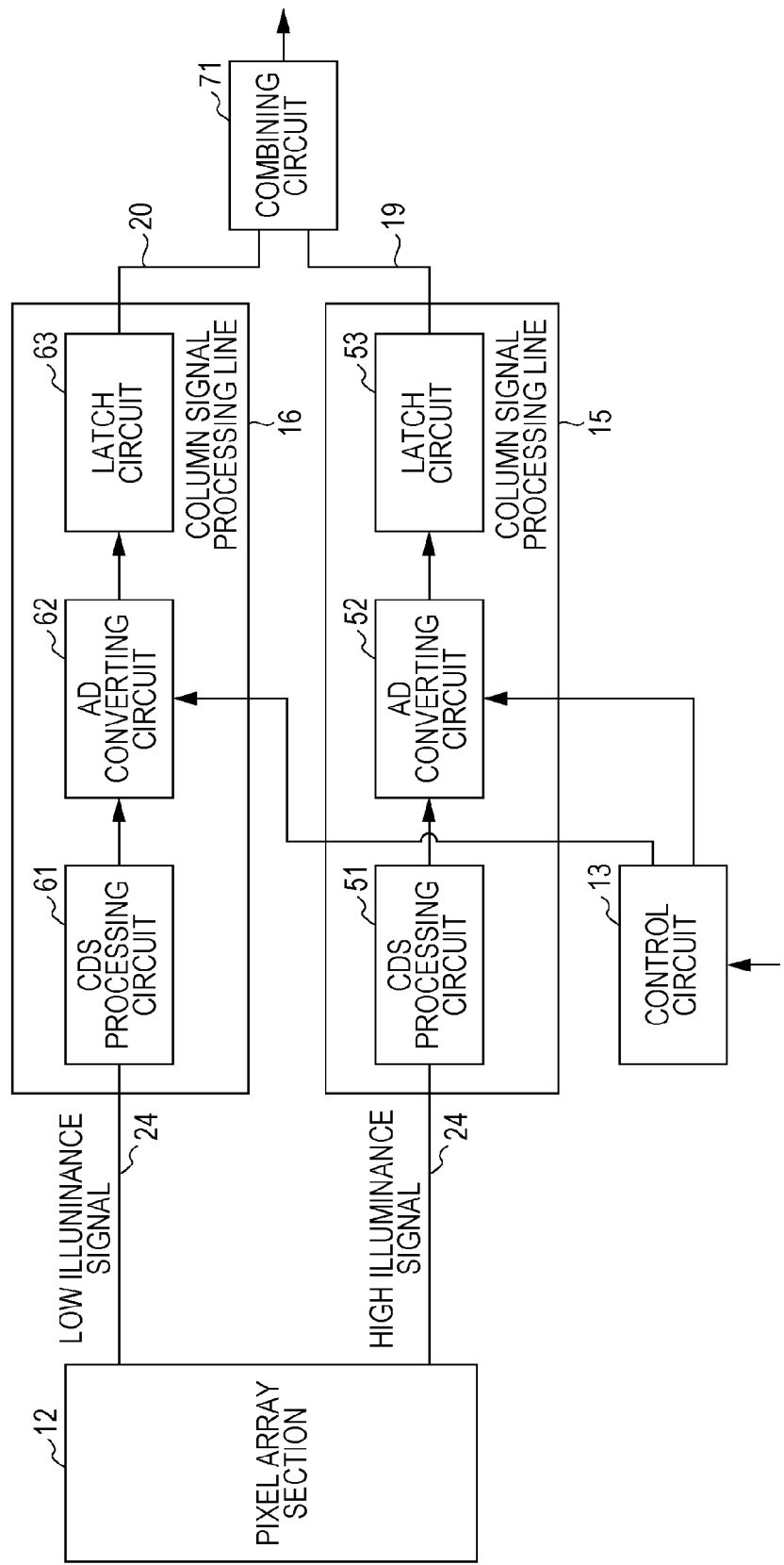
FIG. 4 is a block diagram illustrating an example of a configuration of a column signal processing circuit.

FIG. 4 is a block diagram illustrating an example of a column signal processing circuits 15, 16. Herein, for convenience of explain, all of signals in the column signal processing circuits 15, 16 are indicated in direction from left to right.

The column signal processing circuit 15 is able to be constituted with a CDS processing circuit 51, an AD conversion circuit 52 and a latch circuit 53.

The CDS processing circuit 51 eliminates the unit pixel's intrinsic fixed-pattern noises from signal level (the high illuminance portion) corresponding to the light amount of the incident light, by taking differences between the reset levels and the signal levels as aforementioned which are supplied via a vertical signal line 24 from the unit pixels 11 constituting the unit pixel array section 12 and then carrying out the CDS process. The AD conversion circuit 52 converts the analog signal (the high illuminance portion) eliminated noises by the CDS processing circuit 51 on the basis of the control circuit 13. The digital circuit 53 stores the digital signal which is Ad-converted and output from the AD conversion circuit 52.

The column signal processing circuit 16 has basically the same configuration as the column signal processing circuit 15. Specifically, the column signal processing circuit 16 is constituted with a CDS processing circuit 61, an AD conversion circuit 62 and a latch circuit 63.

Namely, the CDS processing circuit 61 eliminates the unit pixel's intrinsic fixed-pattern noises from a signal level (the low illuminance portion) corresponding to the light amount of the incident light by carrying out the CDS process to take a difference between the reset level and the signal level as aforementioned which is supplied via a vertical signal line 24 from the unit pixel 11 constituting the unit pixel array section 12. The AD conversion circuit 62 converts the analog signal (the high illuminance portion) in which a noise is eliminated in the CDS processing circuit 61 on the basis of the control circuit 13. The digital circuit 63 stores the digital signal which is Ad-converted and output from the AD conversion circuit 62.

Like this, a digital signal DH corresponding to the high illuminance signal stored in the latch circuit 53 is read-out by the horizontal scan of the horizontal driving circuit 17 via the horizontal scan line 19, and a digital signal DL corresponding to the low illuminance signal stored in the latch circuit 63 is read-out by the horizontal scan of the horizontal driving circuit 18 via the horizontal scan line 20.

In addition, the combining circuit 71 combines the digital signal DH corresponding to the low illuminance signal read-out from the latch circuit 53 and the digital signal DL corresponding to the low illuminance signal read-out from the latch circuit 63 to output a combination signal D. Further, the combining circuit 71 is provided with a memory storing and holding signals corresponding to a plurality of rows, and it is able to store and hold temporarily the signal from the read-out row 1, and thus, when the same pixel signal from the read-out row 2 is output, it is able to combine each of signals.

In addition, in FIG. 4, though the output circuits 21, 22 are not illuminated, actually, as illuminated with reference with FIG. 1, the unit pixel signal from the column signal processing circuit 15 is supplied to the output circuit 21, and the unit pixel signal from the column signal processing circuit 16 is supplied to the output circuit 22. That is, the combining circuit 71 combines the digital signal DH output from the output circuit 21 and the digital signal DL output from the output circuit 22.

Combining of Low Illuminance Signal and High Illuminance Signal

Herein below, with reference to FIG. 5 and FIG. 6, there is given disclosures of the process combining a digital signal DH corresponding to the high illuminance portion and a digital signal DL corresponding to the low illuminance portion by the combining circuit 71.

In addition, hereinafter, the digital signal DH corresponding to the high illuminance signal and the digital signal DL corresponding to the low illuminance signal are referred to a high illuminance signal DH and a low illuminance signal DL, respectively.

Figure 5:
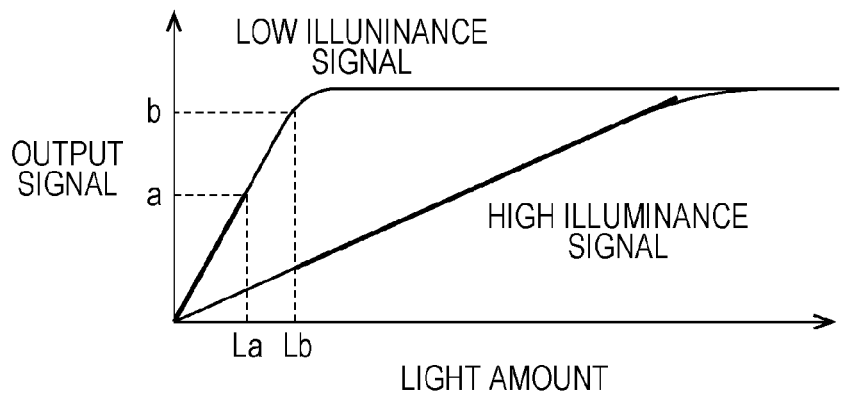
FIG. 5 is a diagram illustrating a dynamic range of a low illuminance signal and a high illuminance signal to an incident light amount.

FIG. 5 illustrates a dynamic range of a low illuminance signal DL and a high illuminance signal DH for an incident light amount of the CMOS image sensor 10.

Here, if a ratio (sensitivity ratio) of sensitivities of an analog of the low illuminance signal and the high illuminance signal, in other words, an analog output ratio of the unit pixel 11 per a unit light amount is 4:1, the ratio of the light amount (light amount ratio) per 1 mV of the low illuminance signal and the high illuminance signal is became 1:4, and in the low illuminance signal DL and the high illuminance signal DH per the quantized unit (1 LSB) of AD conversion, a relationship of the following formula (1) is established.

$$\text{Low illuminance signal } DL = \text{high illuminance signal } DH \times 4 \quad (1)$$

At this time, the combining circuit 71 outputs the low illuminance signal DL for the low illuminance portion on a screen as it is, as a combination signal D and amplifies the high illuminance signal DH for the high illuminance portion on the image surface, 4 times and outputs the signal as a combination signal D. Namely, the combining circuit 71 outputs either the low illuminance portion DL or the high illuminance portion DH, as the combination signal D, selectively. Thereby, it is able to expand the dynamic range.

However, actually, since a deviation is included in relation to the formula (1), it is not able to output a correct digital signal of light amount near a border when selected either any one of the low illuminance signal DL or the high illuminance signal DH.

Therein, the combining circuit 71 outputs a combining signal D representing by the following formula (2) such that in case that the range of La and Lb illuminating on FIG. 5 is at low illuminance side, it is added (weighted average) to the low illuminance signal DL and in case that the range of La and Lb is at high illuminance side, it is added to the high illuminance signal DH.

$$\text{Combining signal } D = \text{low illuminance signal } DL \times \alpha + \text{high illuminance signal } DH \times 4 \times (1-\alpha) \quad (2)$$

Figure 6:
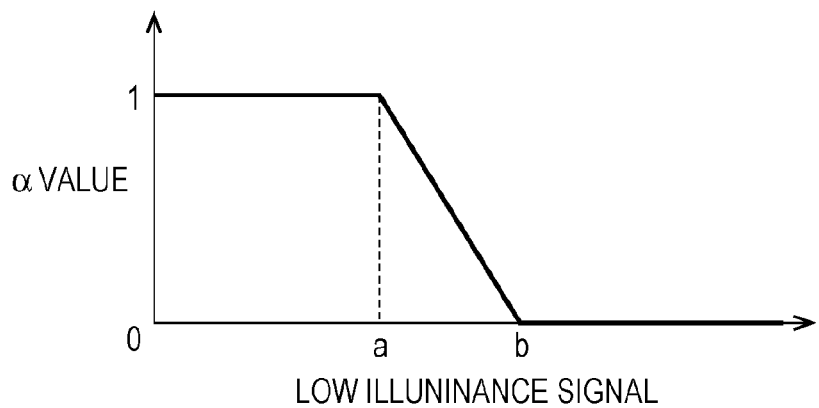
FIG. 6 is a diagram illustrating a coefficient using for combining of the low illuminance signal and the high illuminance signal.

Further, in the formula (2), coefficient $\alpha$ is substituted by a value indicating on FIG. 6. Namely, the coefficient $\alpha$ takes 1 in case that the low illuminance signal DL is smaller than a value a corresponding to a light amount La and takes 0 in case that the low illuminance signal DL is larger than a value b corresponding to a light amount Lb. Also, In case that the low illuminance signal DL is larger than the value a corresponding to the light amount La and is smaller than the value b corresponding to the light amount Lb, the coefficient α changes from 1 to 0 according to increasing of the low illuminance signal DL. Further, the value 4 in the formula (2) is a value by light amount ratio of the low illuminance signal and the high illuminance signal per a quantized unit.

Thereby, the combining circuit 71 outputs the low illuminance signal DL (in FIG. 5, solid line portion of low illuminance signal) as a combination signal D in case that the light amount is smaller than La and outputs a value that is multiplied the high illuminance signal DH (in FIG. 5, solid line portion of the high illuminance signal) by 4 folds as a combined signal in case that the light amount is larger than Lb, and further, outputs a combination signal D obtained by the weighted average value presented in the formula (2) above in case that the light amount is larger than La and is smaller than Lb.

By above, the combining circuit 71 is able to output a correct digital signal in companying with expanding the dynamic range.

By the way, in case of raising the gain setting of CMOS image sensor 10 related to the present embodiment, a process raising the analog gain is carried out. Specifically, the control circuit 13 sets the quantized unit (1 LSB) of the AD conversion by the AD conversion circuits 52, 62 according to setting of the analog gain. Specifically, for example, in order to get two fold of a gain of the digital signal output from the combining circuit 71, in other words, the low illuminance signal DL and the high illuminance signal DH output from the column signal processing circuits 15, 16, the quantized unit of the AD conversion by the AD conversion circuits 52, 62 should be ½ fold.

Figure 7:
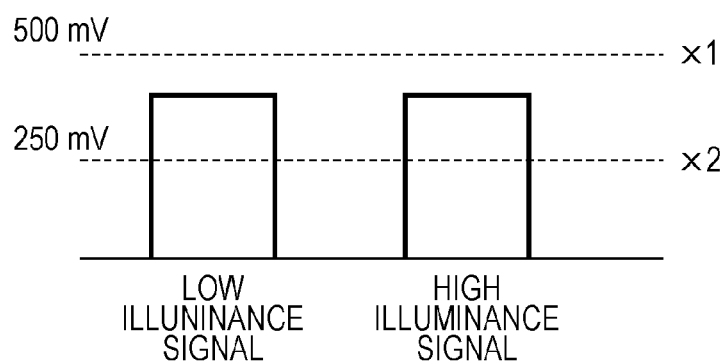
FIG. 7 is a diagram illustrating a relationship of an analog gain with an input gain of an AD conversion circuit.

Here, in FIG. 4, a signal (analog signal) from the unit pixel 11 of the unit pixel array 12 outputs 400 mV maximum and each input range of the AD conversion circuits 52, 62 is 0 to 500 mV. In case that the gain setting of analog gain, as illuminated on FIG. 7, the low illuminance signal and the high illuminance signal are AD-converted by maximum output (400 mV) of the unit pixel 11 together. However, in case that the gain setting of the analog gain is 2 fold, in order that the quantized unit AD-converted becomes ½ fold, each input range of the AD conversion circuits 52, 62 is relatively became 0 to 250 mV. Therefore, as illustrated on FIG. 7, the low illuminance signal and the high illuminance signal are AD-converted only by 250 mV of signal portion and thus the information corresponding to 250 to 400 mV of signal I portion is lost.

In this case, for example, with regard to the low illuminance signal of FIG. 5, the information corresponding to the signal obtainable near the light amount La among signals representing with the solid line portion output as it is as the combination signal D is discarded to be lost. Though this lost information may be obtained from the high illuminance portion, since the S/N of the high illuminance portion is low than the low illuminance portion, there is worry about that the S/N of image is became low.

Therein, the control circuit 13 determines the grayscale number of the digital output of the AD conversion for the low illuminance portion by the AD conversion circuit 62 according to the gain setting of the analog gain. Specifically, the control circuit 13 is capable of controlling to get bigger the grayscale number, namely, grayscale number, of digital output of the AD conversion for the low illuminance portion by the AD conversion circuit 62 when raising the analog gain. Here, so called the grayscale number is an AD-converted grayscale number multiplied by 2 squares such that 10 bits are corresponding to 1024 and 12 bits are corresponding to 4096, etc. In addition, according to a kind of the AD conversion circuit, it is able to carry out the AD conversion with grayscale number of not 2 squares, but e.g. 3000 and the like.

Figure 8:
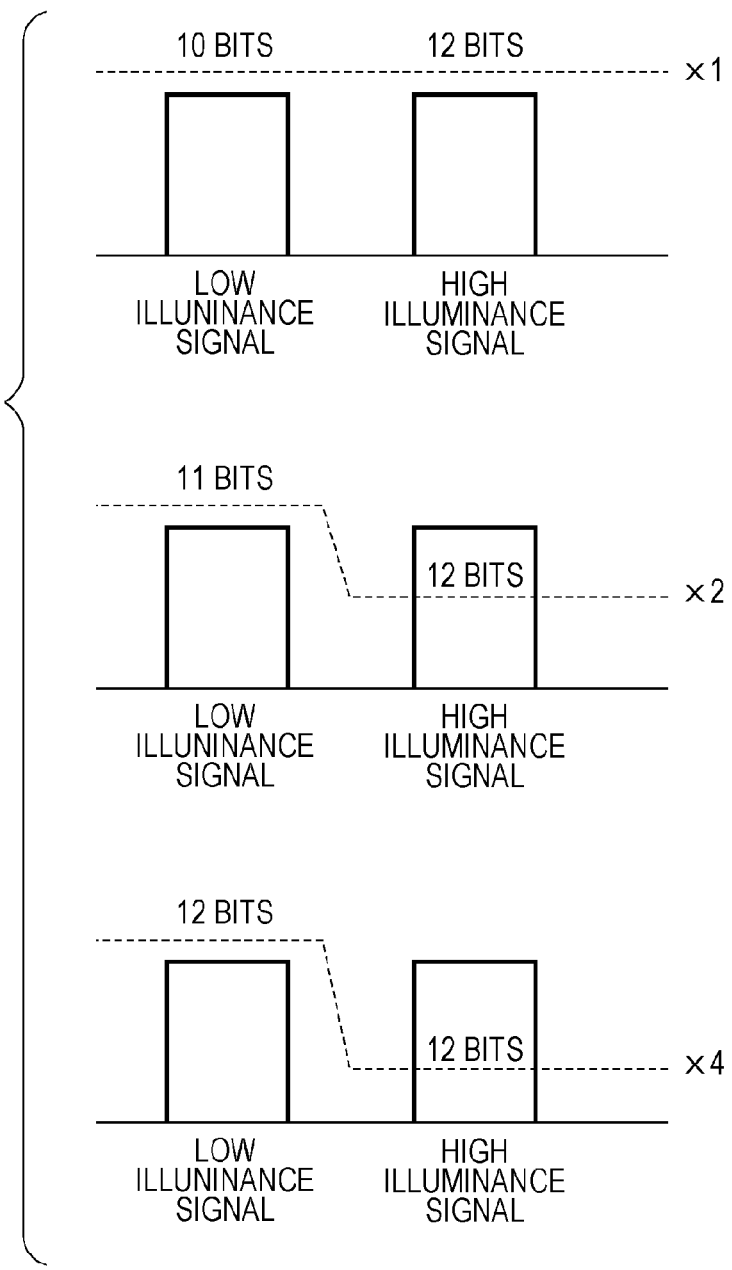
FIG. 8 is a diagram illustrating a relationship of the analog gain with the input gain of an AD conversion circuit.

Relationship of Analog Gain with Grayscale Number of AD Conversion for Low Illuminance Signal Herein, with reference to FIG. 8 and FIG. 9, an explanation to relationship of the gain setting with the grayscale number of the AD converted analog gain is given. FIG. 8 illustrates a relationship of an analog gain with the grayscale number of the AD conversion for the low illuminance signal and the high illuminance signal, FIG. 9 illustrates the grayscale number of AD conversion, the input range, the quantized unit (1 LSB) and the light amount ratio near 1 LSB of the low illuminance signal and the high illuminance signal for the analog gain.

In addition, each of the AD conversion circuits 52, 62 is able to convert a maximum 12 bits of the digital output and thus is able to vary the grayscale number (grayscale number).

Specifically, for example, in case that the AD conversion circuits 52, 62 have a configuration comparing a reference voltage with an input voltage or is a delta sigma typed-AD conversion circuit, the grayscale number is able to be varied by either one of changing an operation frequency of a counter or changing a time covering the AD conversion. Further, in case that the AD conversion circuits 52, 62 is a sequential compared-typed AD conversion circuit, the grayscale number is able to be varied by a number of comparison. Further, in case that AD conversion circuits 52, 62 is a flash typed-AD conversion circuit, the grayscale number is able to be varied by being an unnecessary comparator in standby state, and in case that AD conversion circuits 52, 62 is a pipeline typed-AD conversion circuit, the grayscale number is able to be varied by changing of the used stage number.

Furthermore, the AD conversion circuits 52, 62 are not limited to the above configuration and are preferable to adapt a configuration having a variable grayscale number.

(1) A Case of Usual Gain (Gain Setting is 1 Fold) without any Gain Setting

First, as illustrated on FIG. 8 upper side, the low illuminance signal and the high illuminance signal are AD-converted by the maximum output (for example, 400 mV) of the unit pixel 11 of the unit pixel array section 12 together. At this time, the digital output AD-converted by the AD conversion circuit 62 for the low illuminance portion is regarded as maximum 10 bits and the digital output AD converted by the AD conversion circuit 52 for the high illuminance portion is became maximum 12 bits by the control circuit 13.

In this case, as illustrated on FIG. 9, each input range of the AD conversion circuits 52, 62 is 0 to 500 mV, and the quantized unit of the AD conversion by the AD conversion circuits 52, 62 is became approximately 0.13 mV and 0.5 mV respectively. Further, if the sensitivity ratio of the low illuminance signal and the high illuminance signal, that is, the analog output ratio of the unit pixel 11 per a unit light amount is 16:1, the light amount ratio per 1 mV of the low illuminance signal and the high illuminance signal is became 1:16 and thus the light amount ratio of the quantized unit (1 LSB) of the low illuminance signal and the high illuminance signal is became 1:4 (in FIG. 9, a value representing a size of light amount of the high illuminance portion when the size of light amount of the low illuminance portion per quantized unit is 1 is 4. Also, if the quantized unit (1 LSB) of the low illuminance portion is a reference, the input range of the AD conversion circuit 52 for the high illuminance portion is became 14 bits part. Thus, the combination signal D is became 14 bits.

(2) A Case in which Gain Set is Two Fold

In this case, according to the control circuit 13, the quantized unit of the AD conversion by the AD conversion circuits 52, 62 is ½ fold in relation to a usual gain value. At this time, according to the control circuit 13, as illustrated on FIG. 8 mid-stage, the AD-converted digital output for the high illuminance portion by the AD conversion circuit 62 is regarded as maximum 11 bits and the AD-converted digital output for the low illuminance portion by the conversion circuit 52 is regarded as maximum 12 bits. Thereby, the high illuminance portion is AD-converted only by signal portion of 250 mV, and thus the information corresponding to the signal portion of 250 to 400 mV is lost, but the low illuminance portion is AD-converted by the maximum output of the unit pixel 11.

Namely, as illustrated on FIG. 9, if each input range of the AD conversion circuits 52, 62 is became 250 mV and 500 mV respectively, the quantized unit of the AD conversion by the AD conversion circuits 52, 62 are became 0.063 and 0.25 mV respectively. Also, if the sensitivity ratio of the low illuminance signal and the high illuminance signal is 16:1, the light amount ratio per 1 mV of the low illuminance signal and the high illuminance signal is became 1:16 and thus the light amount ratio per a quantized unit (1 LSB) of the low illuminance signal and the high illuminance signal is became 1:4 as in case of the usual gain. Also, if the quantized unit (1 LSB) of the low illuminance portion is a reference, the input range of the AD conversion circuit 52 for the high illuminance portion is became 14 bits portion. Thus, the combination signal D is became 14 bits.

(3) A Case in which Gain Set is 4 Fold

In this case, according to the control circuit 13, the quantized unit of the AD conversion by the AD conversion circuits 52, 62 is ½ fold in relation to a case the gain value is two fold. At this time, according to the control circuit 13, as illustrated on the lower side of FIG. 8, the AD-converted digital output for the low illuminance portion by the conversion circuit 62 is regarded as maximum 12 bits and the AD-converted digital output for the high illuminance portion by the conversion circuit 52 is became maximum 12 bits. Thereby, the high illuminance portion is AD-converted only by signal portion of 125 my, and thus the information corresponding to the signal portion of 125 to 400 mV is lost, but the low illuminance portion is AD-converted by the maximum output of the unit pixel 11.

Namely, as illustrated on FIG. 9, if each input range of the AD conversion circuits 52, 62 is became 125 mV and 500 mV respectively, the quantized unit of the AD conversion by the AD conversion circuits 52, 62 are became 0.031 and 0.13 mV respectively. Also, if the sensitivity ratio of the low illuminance signal and the high illuminance signal is 16:1, the light amount ratio per 1 mV of the low illuminance signal and the high illuminance signal is became 1:16 and thus the light amount ratio per the quantized unit (1 LSB) of the low illuminance signal and the high illuminance signal is became 1:4 as in case of the usual gain. Also, if the quantized (1 LSB) of the low illuminance portion is a reference, the input range of the AD conversion circuit 52 for the high illuminance portion is became 14 bits portion. Thus, the combination signal D is became 14 bits.

(4) A Case in which Gain Set is 8 Fold

In this case, according to the control circuit 13, the quantized unit of the AD conversion by the AD conversion circuits 52, 62 is ½ fold in relation to a case the gain value is 4 fold. Here, the AD conversion circuits 52, 62 AD-converts the digital output by a maximum 12 bits and therefore, according to the control circuit 13, the AD-converted digital output for the low illuminance portion by the conversion circuit 62 and the AD-converted digital output for the high illuminance portion by the conversion circuit 52 are regarded as maximum 12 bits. Thereby, the high illuminance portion is AD-converted only by signal portion of 63 mV, and thus the information corresponding to the signal portion of 63 to 400 mV is lost, and further, the low illuminance portion is AD-converted only by signal portion of 250 mV, and thus the information corresponding to the signal portion of 250 to 400 mV is lost.

Namely, as illustrated on FIG. 9, if each input range of the AD conversion circuits 52, 62 is became 63 mV and 250 mV respectively, the quantized unit of the AD conversion by the AD conversion circuits 52, 62 are became 0.016 mV and 0.063 mV respectively. Also, if the sensitivity ratio of the low illuminance signal and the high illuminance signal is 16:1, the light amount ratio per 1 mV of the low illuminance signal and the high illuminance signal is became 1:16 and thus the light amount ratio per quantized unit (1 LSB) of the low illuminance signal and the high illuminance signal is became 1:4 as in case of the usual gain. Also, if the quantized unit (1 LSB) of the low illuminance portion is a reference, the input range of the AD conversion circuit 52 for the high illuminance portion is became 14 bits portion. Thus, the combination signal D is became 14 bits.

(5) A Case in which Gain Set is 16 Fold

In this case, according to the control circuit 13, the quantized unit of the AD conversion by the AD conversion circuits 52, 62 is became ½ fold in relation to a value of the case the gain setting is 8 fold. Here, since AD conversion circuits 52, 62 AD-converts the digital output by a maximum 12 bits, likewise as the case the gain setting is 8 fold, according to the control circuit 13, the digital output AD-converted for the low illuminance signal by the AD conversion circuit 62 and the digital output AD-converted for the high illuminance signal by the AD conversion circuit 52 are all regarded as maximum 12 bits. Thereby, the high illuminance signal is AD-converted only by signal of 31 mV, and thus the information corresponding to the signal of 31 to 400 mV is lost, and further, the low illuminance signal is AD-converted only by signal of 125 mV, and thus the information corresponding to the signal of 125 to 400 mV is lost.

Namely, as illustrated on FIG. 9, if each input range of the AD conversion circuits 52, 62 is became 31 mV and 125 mV respectively, the quantized unit of the AD conversion by the AD conversion circuits 52, 62 are became approximately 0.008 mV and 0.031 mV respectively. Also, if the sensitivity ratio of the low illuminance signal and the high illuminance signal is 16:1, the light amount ratio per 1 mV of the low illuminance signal and the high illuminance signal is became 1:16 and thus the light amount ratio per quantized unit (1 LSB) of the low illuminance signal and the high illuminance signal is became 1:4 as in case of the usual gain. Also, if the quantized (1 LSB) of the low illuminance signal regards as a reference, the input range of the AD conversion circuit 52 for the high illuminance signal is became 14 bits part. Thus, the combination signal D is became 14 bits.

As above, in the case of usual gain, if the control circuit 13 is capable of controlling to determine the grayscale number of the AD conversion for the low illuminance portion by the AD conversion circuit 62 smaller bits number than the grayscale number of the AD conversion for the high illuminance portion by the AD conversion circuit 52, and is capable of controlling to be more greater (increasing the bits number) the grayscale number of the AD conversion for the low illuminance portion by the AD conversion circuit 62 whenever the gain setting is raise, there is no matter that even though the quantized is small and thus it is able to maintain the input range of the AD conversion 62 as the case of the usual gain.

Also, since the AD conversion circuit 62 AD-converts the digital output by maximum 12 bits, the above exemplary embodiment is unable to increase the grayscale number (increasing of bits number) of the AD conversion for the low illuminance portion by the AD conversion circuit 62 in the case that the gain setting is 8 fold. In this case, the information corresponding to the low illuminance portion for which is not AD-converted is lost.

Like this, in the embodiment of FIG. 9, the input range of the AD conversion circuit 62 is able to be maintained by 4 fold of gain setting as in the case of usual gain.

Here, if the AD conversion circuit 62 is able to AD-convert the AD conversion of the digital output by maximum 14 bits, it is able to maintain the input range of the AD conversion circuit 62 by more higher gain setting as in the case of usual gain.

Namely, as illustrated on FIG. 10, in a case the gain setting is 8 fold, according to the control circuit 13, the quantized unit of the AD conversion by the AD conversion circuits 52, 62 is ½ fold in relation to the case the gain value is 4 fold. At this time, according to the control circuit 13, the digital output of the AD conversion for the low illuminance portion by the AD conversion circuit 62 is became maximum 13 bits, and the digital output of the AD conversion for the high illuminance portion by the AD conversion circuit 52 is became maximum 12 bits. Thereby, the high illuminance portion is AD-converted only by signal portion of 63 mV, and thus the information corresponding to the signal portion of 63 to 400 mV is lost, but the low illuminance portion is AD-converted by the maximum output of the unit pixel 11.

Also, in a case the gain setting is 16 fold, according to the control circuit 13, the quantized unit of the AD conversion by the AD conversion circuits 52, 62 is ½ fold in relation to a case the gain value is 8 fold. At this time, according to the control circuit 13, the digital output of the AD conversion for the low illuminance portion by the AD conversion circuit 62 is became maximum 14 bits, and the digital output of the AD conversion for the high illuminance portion by the AD conversion circuit 52 is became maximum 12 bits. Thereby, the high illuminance portion is AD-converted only by signal portion of 31 mV, and thus the information corresponding to the signal portion of 31 to 400 mV is lost, but the low illuminance portion is AD-converted by the maximum output of the unit pixel 11.

Like this, in the embodiment of FIG. 10, the input range of the AD conversion circuit 62 is able to be maintained by 16 fold of gain setting as in the case of usual gain.

Further, in the embodiment of FIG. 10, if the sensitivity ratio is 16 fold and the gain setting is 16 fold, the 500 mV of the low illuminance portion and 31 mV of the high illuminance portion correspond to a substantially same light amount and therefore, the high illuminance portion is not necessary. In this condition as in FIG. 11, it refers preferably that the high illuminance portion is "non-use"

Further, in the above description, though it is assume that each of the AD conversion circuits 52, 62 is to vary the output bits number (grayscale number) of the AD conversion, it may be preferable that the output bits number of the AD conversion circuit 52 is to be fixed to 12 bits and only the output bits number of the AD conversion circuit 62 is to be varied.

Further, in the above description, the reason fixing the grayscale number of the high illuminance portion to an certain value not by variable gain is because the bits number of the combination signal D is fixed to a predetermined value of for example 14, etc. By this, in the system of the followed stage, it is able to process the general 14 bits of signal without corresponding of the configuration adopted the present disclosure. In the system which is preferable even that the bits number of the combination signal D is not fixed, though the combination signal D is changed by raising the gain and at the same time increasing the grayscale of the high illuminance portion, it is able to obtain the information of the most big as possible by processing the signal with reference to the information by a specific mechanism.

Signal Output Process

Figure 12:
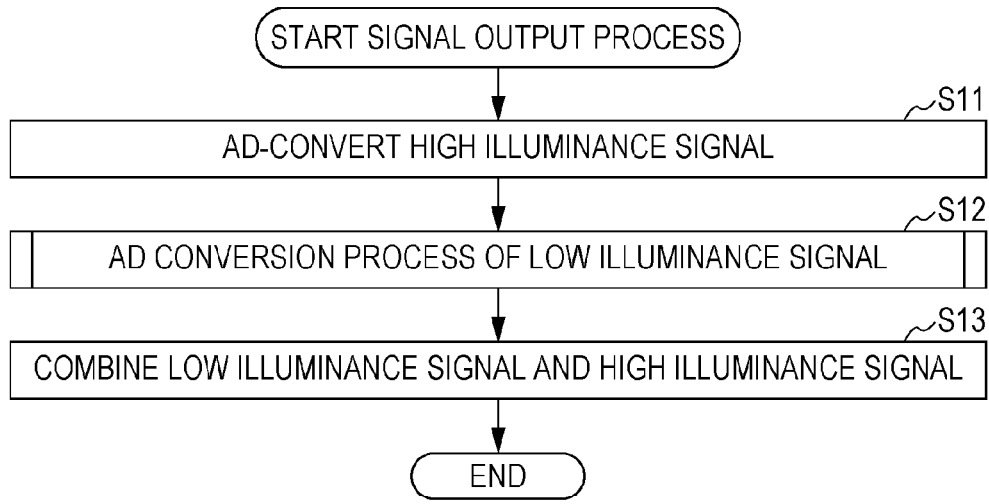
FIG. 12 is a flow chart illustrating of a signal output process.

Next, With reference to FIG. 12, it is given a disclosure of a signal output process which combines the low illuminance signal and the high illuminance signal from the pixel array section 12 to output the combined signal as a digital signal in the CMOS image sensor 10.

In step S11, the column signal processing circuit 15 AD-converts the high illuminance signal from the unit pixel array 12.

Specifically, in the column signal processing circuit 15, the CDS processing circuit 51 carries out the CDS process for a signal (the high illuminance portion) of pixel 11 from the unit pixel array section 12 and supplies the processed signal to AD conversion circuit 52. The AD conversion circuit 52 AD-converts the analog signal of the high illuminance signal from the CDS processing circuit 51 based on the control of a control circuit 13. Here, in case that the gain setting of the analog gain is instructed, the control circuit 13 sets the quantized unit of the AD conversion by the AD converting circuit 52 in according to a gain setting of the instructed analog gain. The digital the high illuminance signal DH AD-converted by the AD conversion circuit 52 is stored in a latch circuit 53.

In step S12, the column signal processing circuit 16 carries out the AD conversion process for the low illuminance portion from the unit pixel array 12. Details of the AD conversion process for the low illuminance portion will be described referring to FIG. 13, but the digital low illuminance portion DL obtained by the result of the low illuminance portion AD converting process is stored in the latch circuit 63.

In step S13, the combining circuit 71 combines the low illuminance portion DH stored in the latch circuit 53 and the low illuminance portion DL stored in the latch circuit 63 to output as the combination signal D on the basis of the above formula 2.

AD Conversion Process of Low Illuminance Signal

Figure 13:
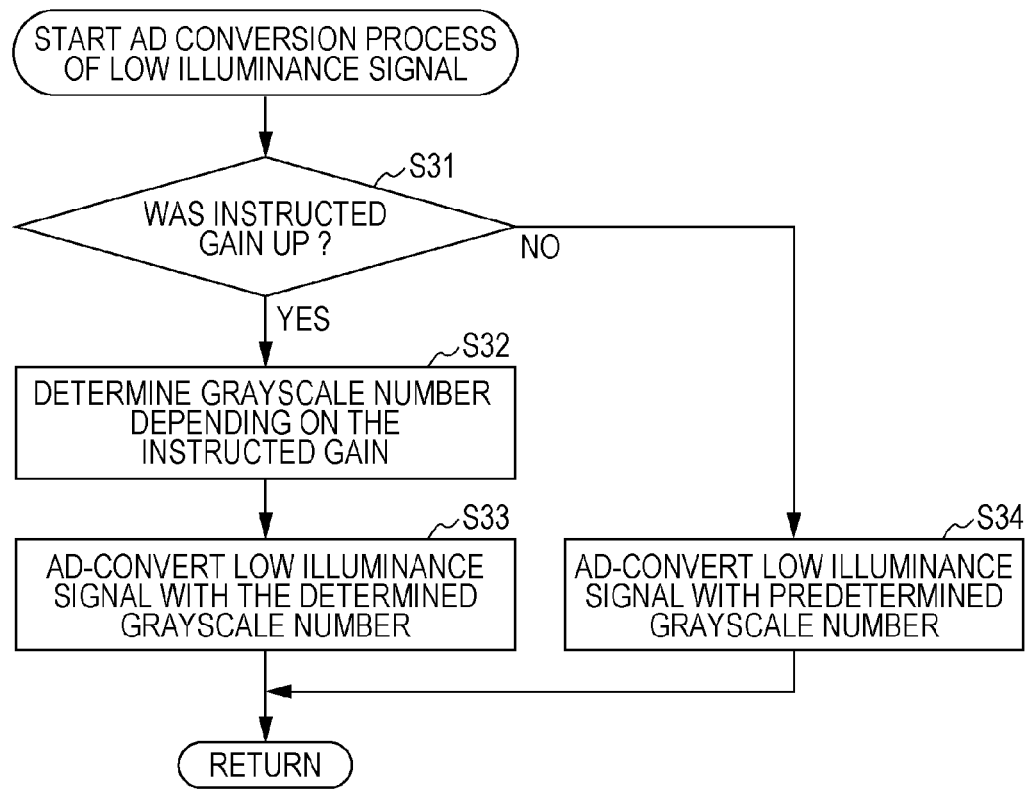
FIG. 13 is a flow chart illustrating of a signal output process.

Next, referring to FIG. 13, details of AD conversion process of the low illuminance portion carried out in the step S12 of a flowchart of FIG. 12 is disclosed.

In step S31, the control circuit 13 determines whether or not the gain-up is instructed, that is, whether or not an instruction of raising the gain setting of the analog gain exists.

In step S31, if it was determined that the gain-up is instructed, the process goes to step S32, and the control circuit 13 is capable of controlling to determine the grayscale number of the AD conversion by the AD conversion circuit 62 according to the instructed gain setting. For example, when an instruction of raising the gain setting to two fold exists, in the embodiment of FIG. 9, the grayscale number of the AD conversion by the AD conversion circuit 62 is determined to 11 bits.

In step S33, the AD conversion circuit 62 AD-converts the determined grayscale number and the low illuminance portion by the control circuit 13.

Specifically, the CDS processing circuit 61 carries out the CDS process for the signal (the low illuminance portion) from the unit pixel 11 of the unit pixel array section 12 to supply to the AD conversion circuit 62. The AD conversion circuit 62 AD-converts the analog the low illuminance portion from the CDS processing circuit 61 on the basis of the quantized unit of the AD conversion that is set by the control circuit 13 and the grayscale number of the AD conversion determined by the control circuit 13 in response to the gain setting of the analog gain. The digital low illuminance portion DL AD-converted by the AD conversion circuit 62 is stored in the latch circuit 63.

While, in the step S31, when determined that an instruction raising the gain does not exist, the process goes to step S34.

In the S34, the AD conversion circuit 62 AD-converts the low illuminance portion of analog signal from the CDS processing circuit 61 with the predetermined grayscale number determined already by the control circuit 13. The digital low illuminance portion DL AD-converted by the AD conversion circuit 62 is stored in the latch circuit 63.

By the above process, when raising-up the gain setting, by increasing (increasing bits number) the grayscale number of the AD conversion for the low illuminance portion by the AD conversion circuit 62, even though the quantized unit becomes to small, it is able to maintain the input range of the AD conversion circuit 62 as same as before raising of the gain setting. Thus, in case of obtaining multiple signals having different sensitivities and expanding the dynamic range, for example, in the low illuminance portion of FIG. 5, it is able to prevent the loss of information corresponding to signal obtained near the light amount La among the signal representing with solid line portion output as it is as the combination signal D and thus it is able to obtain a high S/N of image.

Also, the AD conversion circuit 62 is able to carry out the AD conversion with a high output it number (grayscale number). However, if the gain setting is low, since it is capable of controlling (driving) to get down the output bits number and carry out AD conversion, even when setting to the low gain, it is able to reduce the power to be consumed by the AD conversion circuit 62.

Further, as disclosed referring to FIG. 9, even though the gain setting is changed, the light amount ratio per the quantized unit of the low illuminance signal and the high illuminance signal is not changed with 1:4. Thus, since it is not necessary to change the formula of the combination signal D representing with the formula (2), it is able to avoid the increasing of an operation load in the combining circuit 71.

In addition, on the above, the technology has been disclosed in connection with an embodiment adapted the present disclosure to a configuration such that varies an exposure time to obtain a plurality of signals having different sensitivities and as the result, expand the dynamic range. However, it is desirable to adapt the present disclosure to other configurations obtainable a plurality of signal having a different sensitivity. Namely, for example, it is also desirable to adapt the present disclosure to a configuration such that obtains a plurality of signals having different sensitivities by a capacitance difference of portions read-out in a pixel and then, expand the dynamic range.

Further, in the above, though the column signal processing circuit has been provided with 2 pieces in a column (on the upper and lower portion of pixel array section 12), it is also desirable to provide with only one piece in a column and to process each pixel signal of a plurality of rows by one column signal processing circuit.

In addition, the present disclosure is not limited to an adaption to the solid-state imaging device. Namely, the present disclosure is able to adapt to a whole electronic apparatus using a solid-state imaging device in an image read-in section (photoelectric conversion section) such as a digital camera or video camera, etc, a potable terminal device having an image sensing function, or a copy machine using a solid-state imaging device in an image read-out section, or the like. The solid-state imaging device may be an integrated form into one-chip, or a module type having an image sensing function in which an image sensing section and signal processing section, or optical system are arranged and packaged into one form.

Configuration Example of Electronic Appliance Adapted to Present Disclosure

Figure 14:
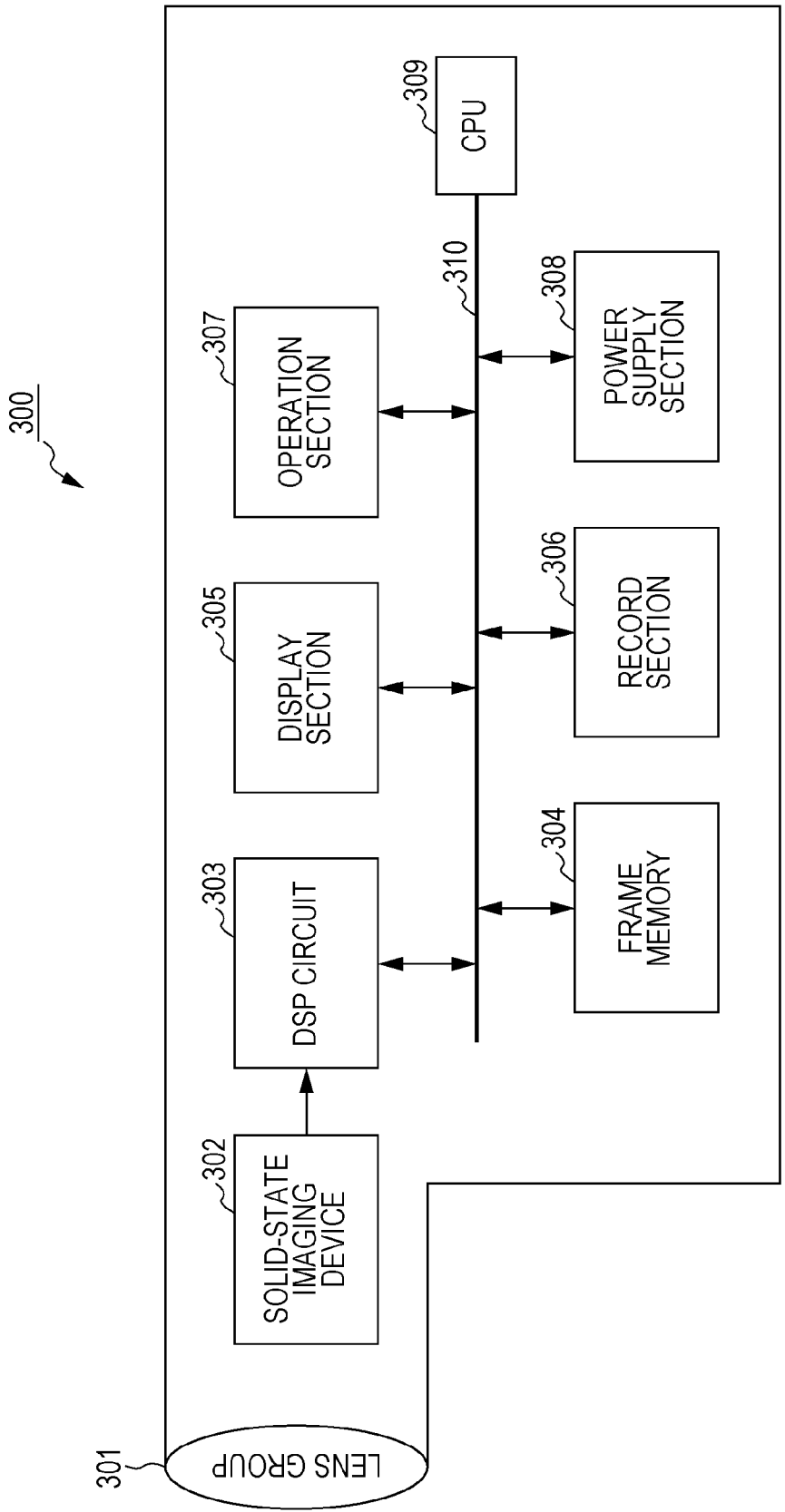
FIG. 14 is a diagram illustrating an example of a configuration of an embodiment of an electronic apparatus adapted to the present disclosure.

FIG. 14 is a block diagram illustrating an example of the image sensing device in electronic appliances provided with the present disclosure.

The imaging device 300 of FIG. 14 may be provided with an optical section 301 constituted by a lens group, etc., a solid-state imaging device (image sensing device) 302 to which each of the configuration for the unit pixel 11 disclosed above is adapted, and a DSP (Digital Signal Processor) circuit 303 as of a camera signal processing circuit. Further, the imaging device 300 may be also provided with a frame memory 304, a display section 305, a recording section 306, a control section 307, a power supply section 308 and a CPU 309. The DSP circuit 303, frame memory 304, display section 305, recording section 306, control section 307, power supply section 308 and CPU 309 are connected via a bus line 310 each other.

The optical section 301 receives an incident light (image light) from a subject and forms an image on an image sensing surface of the solid-state imaging device 302. The solid-state imaging device 302 converts the incident light amount formed on the sensing surface into an electric signal of the unit pixel unit by the optical section 301 and outputs the signal as a pixel signal. It is able to use the solid-state imaging device realizing the expansion of the solid-state imaging device, that is, a dynamic range of the CMOS image sensor 10, etc. related to the forms of embodiment disclosed above as the solid-state imaging device 302.

The display section 305 may be formed from, for example, a panel typed-display unit of a liquid crystal panel or an organic EL (Electro Luminescence) panel, for example, to display a dynamic image or a still image which is sensed by the solid-state imaging device 302. The recording section 306 records a dynamic image or a still image sensed by the solid-state imaging device 302 on a recoding medium such as a video tape, DVD (Digital Versatile Disk), or the like.

The control section 307 issues operational commands for carrying out a various functions of the imaging device 300 under a control of user. The power supply section 308 supplies properly various kinds of power sources as power source for driving the DSP circuit 303, frame memory 304, display 305, recording section 306 and control section 307 to portions which the power supply is desired to. The CPU 309 controls the whole operation of the imaging device 300.

In addition, in the imaging device 300, the combining circuit 71 illustrated on FIG. 4 may be preferably included at the output side of the solid-state imaging device 302, and the DSP circuit 303 may preferably carry out an operation in the combining circuit 71. It is preferable that the solid-state imaging device 302 and the DSP circuit 303 may be integrated into one piece of the solid-state imaging device and the DSP circuit 303 converts AD conversion of the low illuminance signal and the high illuminance signal to carry out the operation of the combination signal.

Figure 15:
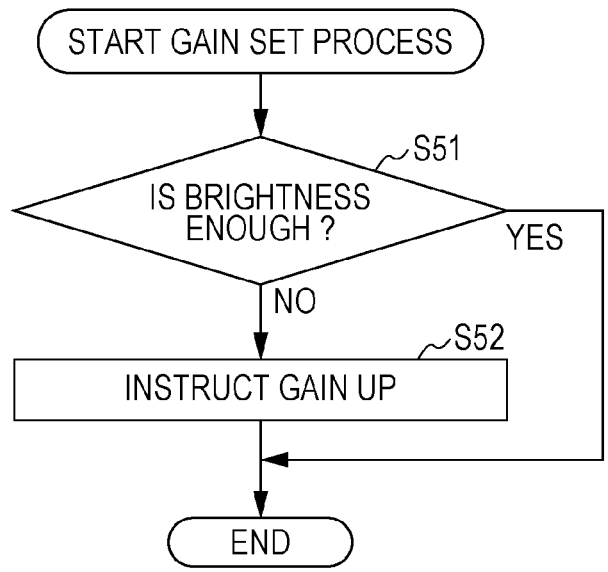
FIG. 15 is a flow chart illustrating for a gain setting process.

Here, referring to a flowchart of FIG. 15, it is given a disclosure of a gain setting process in the imaging device 300. The gain setting process of FIG. 15 processes a case that an image sensing mode is set an auto-image sensing mode in the imaging device 300, and the like, for example.

In step S51, the DSP circuit 303 determines by the solid-state imaging device 302, whether or not a luminance of the sensed image is sufficient. Specifically, DSP circuit 303 determines whether or not the luminance value of the unit pixel signal from the solid-state imaging device 302 is greater than a predetermined value.

In Step S51, if determined that the luminance value is not sufficient, in step S52, the DSP circuit 303 instructs the gain-up to the solid-state imaging device 302. Specifically, the DSP circuit 303 instructs raising the gain setting of analog gain to the control circuit (e.g. corresponding to the control circuit 13 of CMOS image sensor 10) of the solid-state imaging device 302. Thereby, the solid-state imaging device 302 is able to output the gained-up digital signal (pixel signal).

In a while, in step S51, if determined that the luminance is sufficient, the process is ended.

By carrying out the above process at a predetermined interval, even when being in the dark place, it is able to display or record images brightly.

Further, as in the above description, by using the CMOS image sensor 10 related to the aforementioned embodiments as the solid-state imaging device 302, it is able to expand the dynamic range as well as to secure a high S/N. Thus, it is capable to implement a high quality of the sensing image even for the imaging device 300 of the video camera, a digital camera, and camera module, etc. for mobile apparatus such as a cell phone.

Further, in the above embodiment, there is disclosed of an exemplary embodiment adapted to the CMOS image sensor which the unit pixels for detecting the signal electrical charge corresponding to the light amount of the visible light as a physical amount which is arranged in the shape of rows and columns. However, the present disclosure is not limited to the adaption to the CMOS image sensor, but may be adapted to a whole of the column typed-solid-state imaging device in which the column processing section is arranged for each pixel row of the unit pixel array.

Further, the present disclosure is not limited to an adaption to the solid-state imaging device detecting the distribution of the incident light amount of a visible light and image-sensing as a image, but may be adapted to a whole of the solid-state imaging device (physical amount distribution sensing apparatus) such as a solid-state imaging device sensing a distribution of incident amount of an infrared ray, X ray, or particle, or the like as an image, or a finger-print detecting sensor changing a distribution of other physical amount of a pressure or an electrostatic capacity, etc. in a wide meaning into an electric signal and integrating in time to sense the image.

In addition, in the present specification, though the step disclosed on the flow chart is according to the sequence as disclosed and is processed in time-series, it may be processed not in time-series, but in parallel or in a desired timing when called, or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
a first plurality of pixels configured to output a first illuminance signal;
a second plurality of pixels configured to output a second illuminance signal;
a first Analog-Digital (A/D) converter configured to convert the first illuminance signal into a first digital signal, wherein the first A/D converter includes a first counter;
a second A/D converter configured to convert the second illuminance signal into a second digital signal, wherein the second A/D converter includes a second counter; and
a combining circuit configured to combine the first digital signal and the second digital signal,
wherein a value of the first illuminance signal is higher than that of the second illuminance signal.

2. The imaging device according to claim 1, wherein the first A/D converter and the second A/D converter are a delta-sigma type A/D converter.

3. The imaging device according to claim 1, wherein the first A/D converter includes a first plurality of comparators and the second A/D converter includes a second plurality of comparators.

4. The imaging device according to claim 1, further comprising a control unit that controls grayscale numbers of the first A/D converter and the second A/D converter.

5. The imaging device according to claim 1,
wherein the first illuminance signal corresponds to a high illuminance portion of an image and the second illuminance signal corresponds to a low illuminance portion of the image,
wherein an exposure time of the first illuminance signal is less than an exposure time of the second illuminance signal.

6. The imaging device according to claim 5, wherein the exposure time of the first illuminance signal is measured from a time of shutter scan to a time of first read-out scan and the exposure time of the second illuminance signal is measured from a time of second read-out scan, wherein the second read-out scan is performed after the first read-out scan.

7. The imaging device according to claim 6, wherein the combining circuit is configured to:
hold the first digital signal of a pixel read-out in the first read-out scan; and
combine the held first digital signal of the pixel with the second digital signal of the pixel read-out in the second read-out scan.

8. The imaging device according to claim 1, wherein the combining circuit is configured to output a combination signal, wherein the combination signal is the second digital signal when a value of incident light amount is less than a predetermined amount.

9. The imaging device according to claim 1, wherein the combining circuit is configured to output a combination signal, where the combination signal is the first digital signal when a value of incident light amount is more than a predetermined amount.

10. The imaging device according to claim 1, wherein the combining circuit is configured to output a combination signal, where the combination signal is a weighted average value of the first digital signal and the second digital signal when a value of incident light amount is between two predetermined amounts.

11. The imaging device according to claim 10, where the weighted average value of the first digital signal and the second digital signal is calculated based on equation 1:

$$\text{combination signal} = \text{first digital signal} \times R \times (1-A) + \text{second digital signal} \times A \quad \text{Equation 1,}$$

wherein R is a value of light amount ratio of the second illuminance signal and the first illuminance signal per quantized unit, wherein a value of A changes from 1 to 0 according to increase in the second digital signal.

12. An electronic apparatus provided with an imaging device, wherein the imaging device comprises:
- a first plurality of pixels configured to output a first illuminance signal;
- a second plurality of pixels configured to output a second illuminance signal;
- a first Analog-Digital (A/D) converter configured to convert the first illuminance signal into a first digital signal, wherein the first A/D converter includes a first counter;
- a second A/D converter configured to convert the second illuminance signal into a second digital signal, wherein the second A/D converter includes a second counter; and
- a combining circuit configured to combine the first digital signal and the second digital signal, wherein a value of the first illuminance signal is higher than that of the second illuminance signal.

* * * * *